(12) United States Patent
Hercules

(10) Patent No.: US 9,493,121 B2
(45) Date of Patent: Nov. 15, 2016

(54) SWITCHABLE REARVIEW MIRROR

(71) Applicants: VOLKSWAGEN AG, Wolfsburg (DE); AUDI AG, Ingolstadt (DE)

(72) Inventor: Jacob Hercules, San Francisco, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/603,725

(22) Filed: Jan. 23, 2015

(65) Prior Publication Data

US 2016/0214538 A1    Jul. 28, 2016

(51) Int. Cl.
| | |
|---|---|
| *G02F 1/29* | (2006.01) |
| *G02F 1/15* | (2006.01) |
| *G02F 1/153* | (2006.01) |
| *G02B 26/02* | (2006.01) |
| *B60R 1/04* | (2006.01) |
| *B60R 1/12* | (2006.01) |
| *G02F 1/017* | (2006.01) |
| *G02F 1/1335* | (2006.01) |
| *G02F 1/157* | (2006.01) |
| *H04N 7/18* | (2006.01) |
| *B60R 1/10* | (2006.01) |
| *G02F 1/161* | (2006.01) |
| *B60K 35/00* | (2006.01) |
| *B60R 1/08* | (2006.01) |
| *G02B 26/00* | (2006.01) |
| *G02B 5/30* | (2006.01) |

(52) U.S. Cl.
CPC ................ *B60R 1/04* (2013.01); *B60K 35/00* (2013.01); *B60R 1/088* (2013.01); *B60R 1/10* (2013.01); *B60R 1/12* (2013.01); *G02F 1/017* (2013.01); *G02F 1/133553* (2013.01); *G02F 1/157* (2013.01); *G02F 1/161* (2013.01); *H04N 7/181* (2013.01); *B60R 2001/1223* (2013.01); *B60R 2001/1246* (2013.01); *G02B 5/3025* (2013.01); *G02B 26/00* (2013.01)

(58) Field of Classification Search
CPC ............. B60R 1/10; B60R 1/02; B60R 1/04; B60R 1/088; B60R 1/084; B60R 1/12; B60R 2001/1223; B60R 2001/1246; B60R 1/081; G02F 1/1313; G02F 1/13363; G02F 1/1506; G02F 1/155; G02F 1/157; G02F 1/161; G02F 1/133553; G02B 5/04; G02B 5/08; G02B 5/20; G02B 27/0101; G02B 27/0172; G02B 27/281; G02B 5/3025; G02B 26/00; G02B 26/02; G08G 1/161; G01S 7/02; B60K 35/00; H04N 7/181; B32B 17/10036; B32B 17/10201
USPC ....... 359/265, 267, 272–275, 227, 233, 364, 359/603, 608, 668, 838, 839, 883, 889; 345/7–9, 105; 349/10–12, 16; 342/27, 342/176
See application file for complete search history.

(56) References Cited

U.S. PATENT DOCUMENTS

| | | | | |
|---|---|---|---|---|
| 1,884,759 | A * | 10/1932 | La Hodny | B60R 1/12 359/603 |
| 3,351,935 | A * | 11/1967 | Nolte, Jr. | G01S 7/02 342/176 |
| 6,979,499 | B2 * | 12/2005 | Walck | B32B 17/10036 250/484.4 |

(Continued)

*Primary Examiner* — Loha Ben
(74) *Attorney, Agent, or Firm* — Barnes & Thornburg LLP

(57) ABSTRACT

A passenger vehicle includes a windshield and a mirror. The mirror is positioned to view objects toward a rear of the passenger vehicle reflected off of the mirror. The mirror blocks a field of view of a user through the windshield.

19 Claims, 7 Drawing Sheets

(56) References Cited

U.S. PATENT DOCUMENTS

| | | | | |
|---|---|---|---|---|
| 7,230,767 B2* | 6/2007 | Walck | ............... | B32B 17/10036 345/7 |
| 7,894,117 B2* | 2/2011 | Finlayson | ................. | B60R 1/08 349/113 |
| 8,508,383 B2* | 8/2013 | Peterson | ................... | B60R 1/12 340/425.5 |
| 8,508,384 B2* | 8/2013 | Uken | .................... | B60K 35/00 340/425.5 |
| 8,508,831 B2* | 8/2013 | De Wind | ................. | B60R 1/04 340/425.5 |
| 8,922,867 B2* | 12/2014 | De Wind | ................. | B60R 1/04 359/267 |
| 2009/0046346 A1* | 2/2009 | Finlayson | ................ | B60R 1/08 359/275 |
| 2015/0232030 A1* | 8/2015 | Bongwald | ................ | B60R 1/00 348/115 |

* cited by examiner

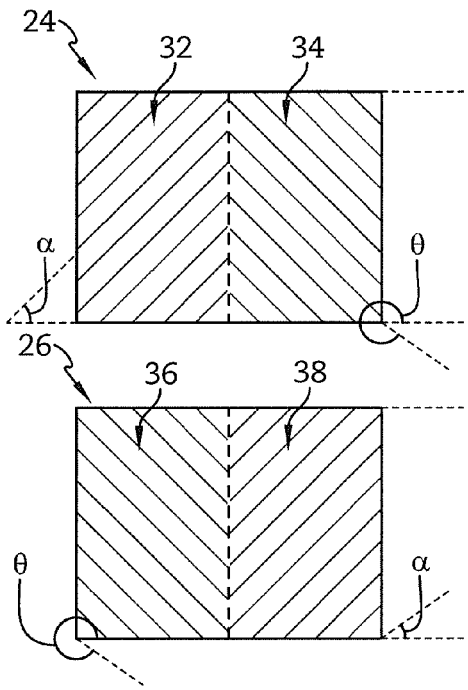
FIG. 4
FIG. 5
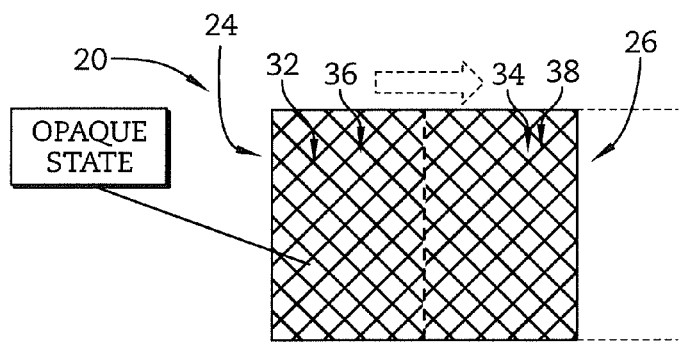
FIG. 6
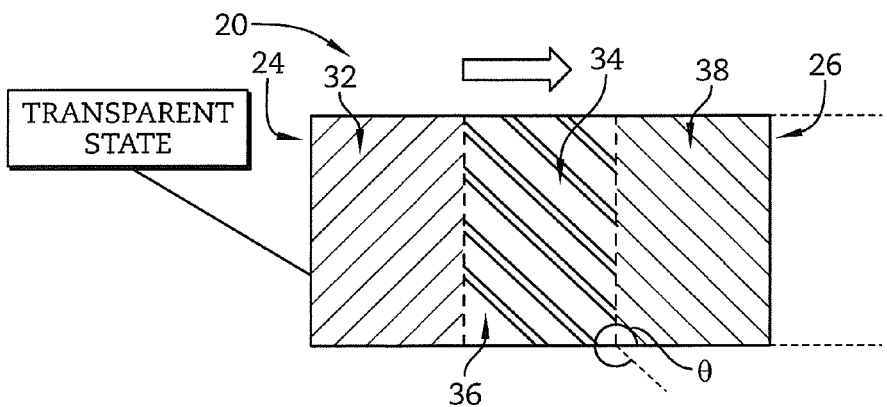
FIG. 7

SWITCHABLE REARVIEW MIRROR

BACKGROUND

The present disclosure relates to rearview mirrors for passenger vehicles. More specifically, the present disclosure is directed to passenger vehicles with adjustable mirrors.

SUMMARY

A passenger vehicle includes a windshield and a mirror. The minor is positioned to view images of objects toward a rear of the passenger vehicle, the images reflected off of the mirror. The mirror may block a field of view of a user through the windshield.

An adjustable mirror in accordance with the present disclosure for use in a passenger vehicle may include a housing adapted to be coupled to a vehicle windshield, a reflective surface in the housing to enable a user to view a rear view of the vehicle, and means for changing an opacity of the reflective surface. The reflective surface may be changed between an opaque state in which a user can view the rear view of the vehicle and a transparent state in which the reflective surface becomes transparent. In the transparent state, the user may view objects positioned on an opposite side of the reflective surface from the user through the transparent reflective surface such that the user can view objects that would otherwise be blocked from view by the reflective surface while in the opaque state.

In illustrative embodiments, the reflective surface, while in the transparent state, allows visibility forward of the passenger vehicle to view objects positioned on an opposite side of the adjustable mirror from the user.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 4 is a front elevation view of one embodiment of a first optics panel of an opacity adjuster showing that the first optics panel includes at least two polarizer sections and suggesting that the polarizer sections have different polarization angles;

FIG. 5 is a front elevation view of one embodiment of a second optics panel of the opacity adjuster showing that the second optics panel includes at least two polarizer sections and suggesting that the polarizer sections have different polarization angles;

FIG. 6 is a front elevation view of the opacity adjuster showing the second optics panel positioned behind the first optics panel and suggesting that the polarizer sections of the first and second panels cooperate to block the passage of light through the opacity adjuster while the optics panels are in a first position to place the opacity adjuster in an opaque state;

FIG. 7 is a similar view to FIG. 5 showing the second optics panel has slid relative to the first optics panel so that the optics panels are in a second position and suggesting that the polarizer sections of the first and second panels cooperate to allow the passage of light through the opacity adjuster while the optics panels are in the second position to place the opacity adjuster in a transparent state;

DETAILED DESCRIPTION

Figure 1:
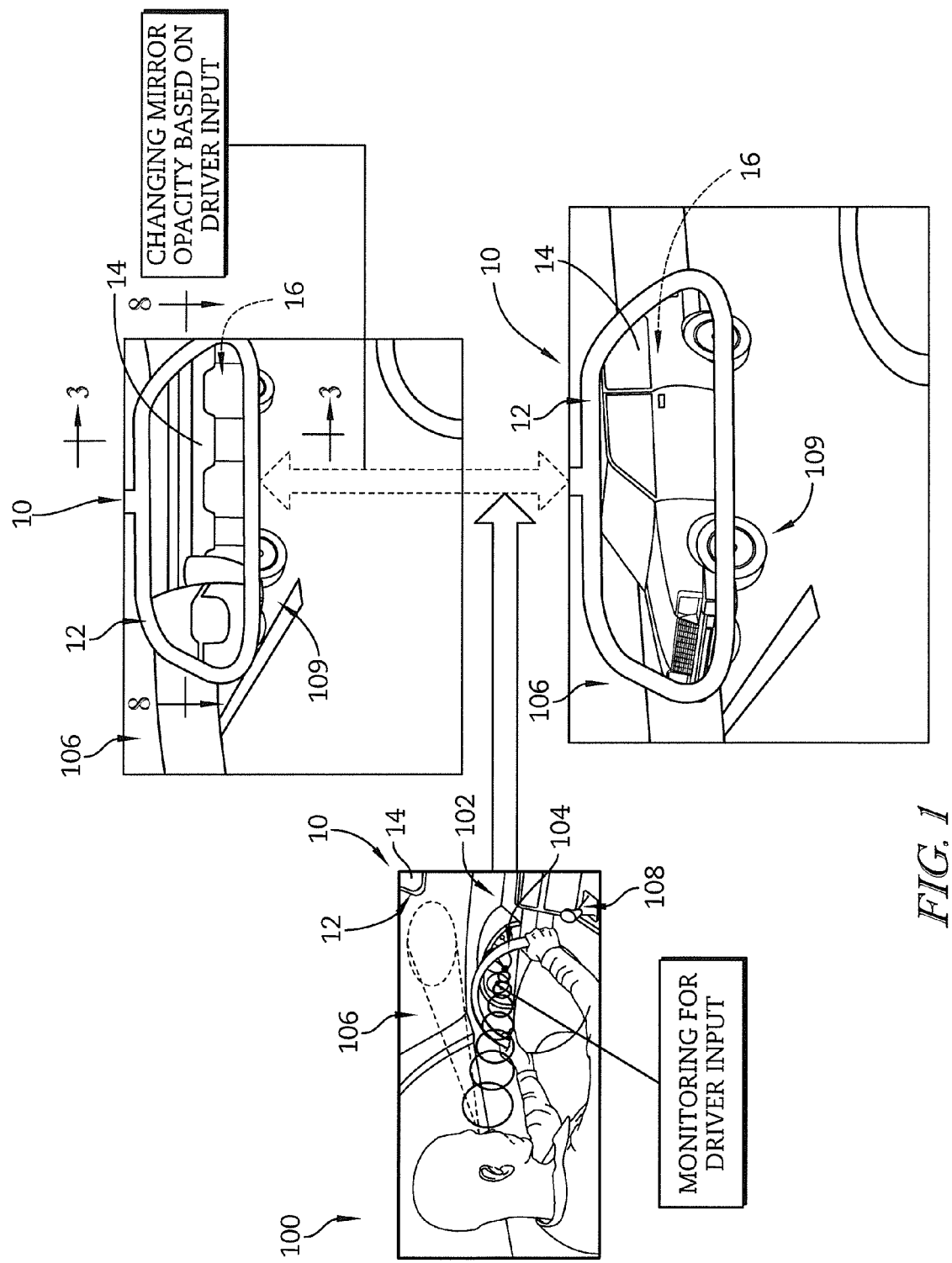
FIG. 1 is a diagrammatic view of a passenger vehicle showing that the passenger vehicle includes a switchable mirror that switches between a reflective opaque state and a non-reflective transparent state based on input from a driver of the passenger vehicle.

An illustrative passenger vehicle 100 includes a seat (not shown) for supporting a user (or driver) in passenger vehicle 100, a dashboard console 102, a steering wheel 104, a windshield 106 coupled to a front end of passenger vehicle 100, and a drive shift mechanism 108 used to engage different drive modes of passenger vehicle 100 as shown in FIG. 1. Passenger vehicle 100 also includes a switchable mirror 10 coupled to windshield 106 for viewing objects behind passenger vehicle 100. Switchable mirror 10 includes a housing 12 coupled to windshield 106 and a reflective surface 14 coupled to housing 12 to allow the user to view objects positioned behind passenger vehicle 100.

Switchable mirror 10 blocks a portion of a viewable area of through windshield 106 and blocks objects from view of the user depending on a position of the user as indicated in FIG. 1. For example, an object 109 positioned in front of passenger vehicle 100 will be blocked from view of the user by switchable mirror 10 if the user's head is positioned at a similar vertical height from a ground level as switchable mirror 10. This can cause dangerous driving conditions for the user because the user is unable to view important characteristics of their environment, such as object 109.

Switchable mirror 10 includes optics 16 coupled to housing 12 and positioned to change an opacity of reflective surface 14 as indicated in FIG. 1. Optics 16 are switchable between: an opaque state where the user is able to see images of objects positioned behind passenger vehicle 100, the images reflected off of reflective surface 14; and a transparent state where the user is able to see objects 109 positioned in front of vehicle 100 through reflective surface 14. Optics 16 switch between the opaque and transparent states based on input from the user.

Figure 2:
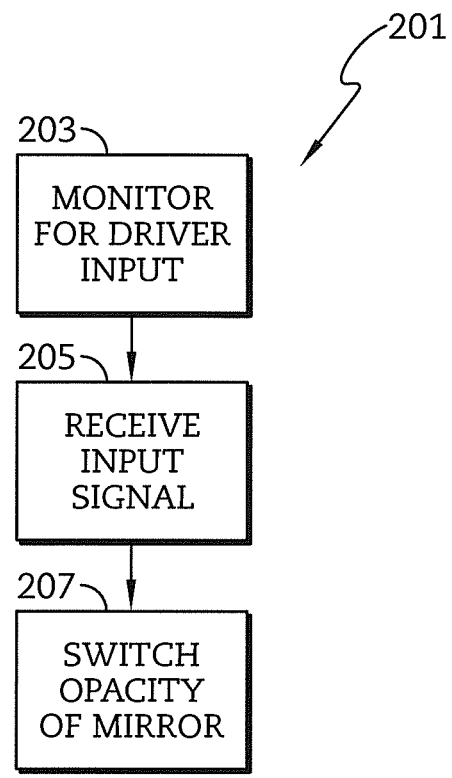
FIG. 2 is a diagrammatic view of an illustrative process showing subroutines for determining when the switchable mirror should be in the reflective opaque state and the non-reflective transparent state.

In one illustrative embodiment, a process 201 for determining when to switch optics 16 between the opaque and transparent states includes a monitoring subroutine 203, a receiving subroutine 205, and a switching subroutine 207 as shown in FIG. 2. Monitoring subroutine 203 includes monitoring for an input from the user to signal optics 16 to switch between the opaque and transparent states. Receiving subroutine 205 includes receiving the input signal to engage optics 16 to switch between the opaque and transparent states. Switching subroutine 207 includes engaging optics 16 to switch optics 16 between the opaque and transparent states.

Figure 3:
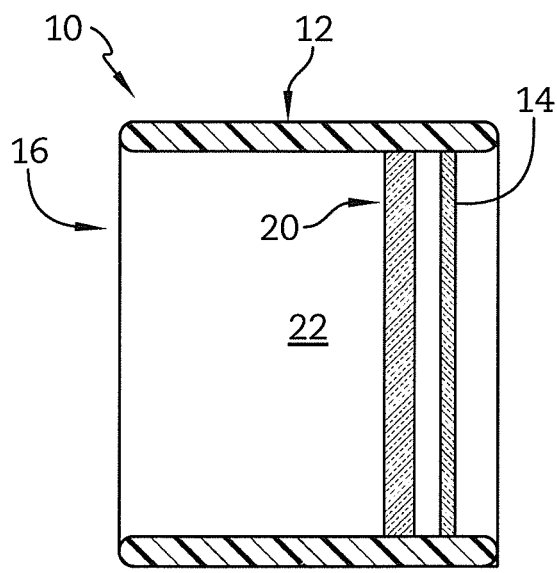
FIG. 3 is a cross-sectional view of the switchable mirror of FIG. 1 showing that the switchable mirror includes a housing, a reflective surface coupled to the housing, and optics coupled to the housing that switches between the opaque state and transparent state.

In one embodiment, optics 16 includes an aperture 22 formed through housing 12 and an opacity adjuster 20 positioned within aperture 22 as indicated in FIG. 3. Opacity adjuster 20 includes a first optics panel 24 and a second optics panel 26 as indicated in FIGS. 4-7. First and second optics panels 24, 26 move relative to one another to block or allow passage of light through opacity adjuster 20.

First optics panel 24 includes at least a first polarizer section 32 and a second polarizer section 34 as indicated in FIG. 4. It should be understood that more polarizer sections may be included in first optics panel 24. In one embodiment, a plurality of polarizer sections are used. First polarizer section 32 is polarized at a polarization angle α. Second polarizer section 34 is polarized at a polarization angle θ. Polarization angles α, θ are offset by 90 degrees from one another. For example, polarization angle α is 45 degrees using a bottom edge of first optics panel 24 as a reference, and polarization angle θ is 315 degrees using a bottom edge of first optics panel 24 as a reference.

Second optics panel 26 includes at least a third polarizer section 36 and a fourth polarizer section 38 as indicated in FIG. 5. It should be understood that more polarizer sections may be included in second optics panel 24. In one embodiment, a plurality of polarizer sections are used. Third polarizer section 36 is polarized at polarization angle θ while fourth polarizer section 34 is polarized at polarization angle α using a bottom edge of second optics panel 26 as a reference.

Top and bottom edges of first and second optics panels 24, 26 are aligned to form opacity adjuster 20 as indicated in FIGS. 6 and 7. First and third polarizer sections 32, 36 overlap one another to block passage of light through opacity adjuster 20 to place optics 16 in the opaque state. Similarly, second and fourth polarizer sections 34, 38 overlap one another to block passage of light through opacity adjuster 20. The offset of polarization angles α, θ allows polarization sections 32, 34, 36, 38 to cooperate to block passage of light through opacity adjuster 20 while in the position shown in FIG. 6.

First and second optics panels 24, 26 slide relative to one another to allow passage of light through opacity adjuster 20 and place optics 16 in the transparent state as indicated in FIG. 7. In one embodiment, an actuator (not shown) is used to move one of the first and second optics panels 24, 26 relative to the other one of the first and second optics panels 24, 26. The actuator may be implemented to include a motor, solenoid, piston, screw, or the like. First and second optics panels 24, 26 may slide to align second and third polarizer sections 34, 36 which may have a common polarization angle θ to allow passage of light through opacity adjuster 20. First and fourth polarizer sections 32, 38 may be misaligned from second and third polarizer sections 34, 36 to also allow passage of light through opacity adjuster 20.

Figure 8:
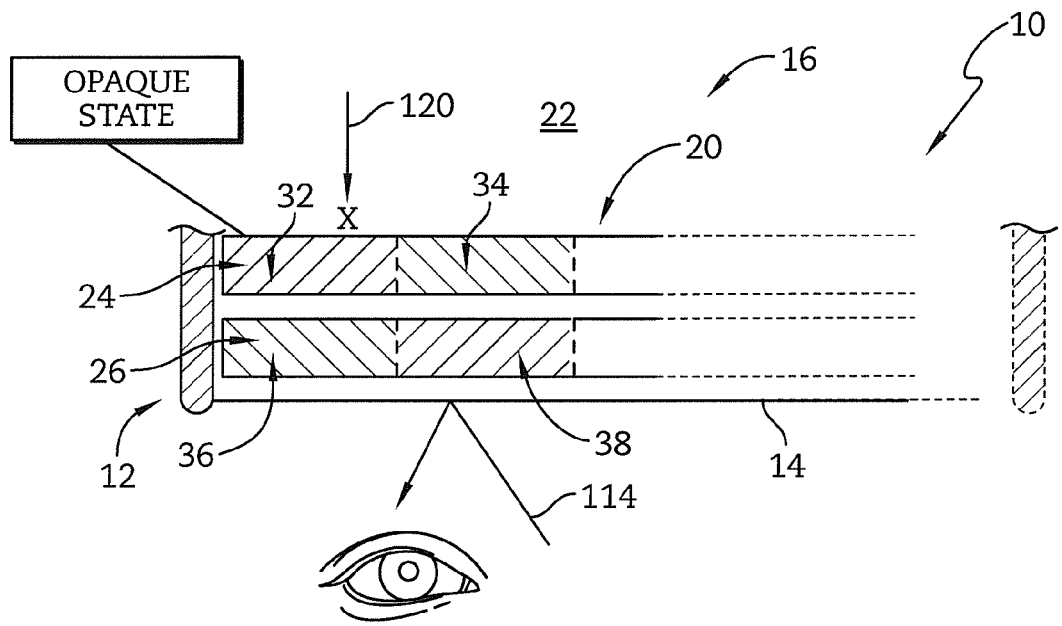
FIG. 8 is a cross-sectional view of the switchable mirror of FIG. 1 showing the optics panels of the opacity adjuster in the first position and suggesting that the view from a front of the passenger vehicle opposite the opacity adjuster is blocked from passing through the opacity adjuster to the driver and suggesting that a reflective surface reflects views from a rear of the passenger vehicle while the opacity adjuster is in the opaque state.

A view of objects 109 on an opposite side of switchable mirror 10 may be blocked from passing through opacity adjuster 20 while first and third polarizer sections 32, 36 are aligned to place optics 16 in the opaque state as indicated by arrow 120 in FIG. 8. A view from behind passenger vehicle 100 may be reflected off of reflective surface 14 while optics 16 are in the opaque state as indicated by arrow 114. Thus, the user may view objects positioned behind passenger vehicle 100 on switchable mirror 10 while optics 16 are in the opaque state.

Figure 9:
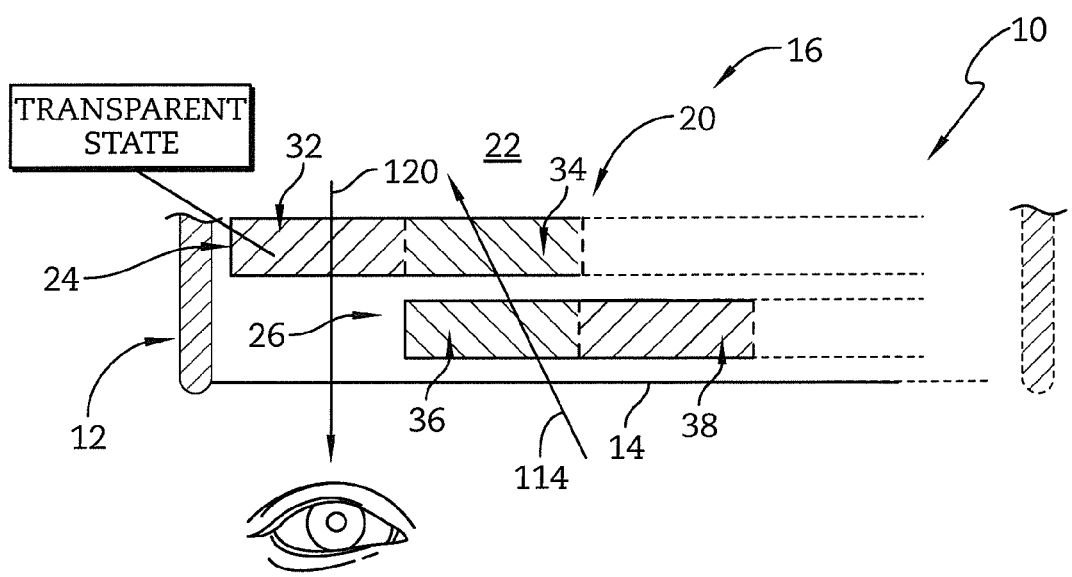
FIG. 9 is a view similar to FIG. 7 showing the optics panels in the second position and suggesting that the view from a front of the passenger vehicle opposite the opacity adjuster is allowed to pass through the opacity adjuster and reflective surface to the driver and suggesting that the reflective surface does not reflect views from the rear of the passenger vehicle while the opacity adjuster is in the transparent state.

A view of objects 109 on an opposite side of switchable mirror 10 may be enabled to pass through opacity adjuster 20 while second and third polarizer sections 34, 36 are aligned to place optics 16 in the transparent state as indicated by arrow 120 in FIG. 9. A view from behind passenger vehicle 100 passes through reflective surface 14 while optics 16 are in the transparent state as indicated by arrow 114. Thus, the user may view objects positioned in front of passenger vehicle 100 through switchable mirror 10 while optics 16 are in the transparent state.

In an illustrative embodiment, reflective surface 14 may be separate from opacity adjuster 20 and coupled to housing 12 as shown in FIGS. 8 and 9. Second optics panel 26 may slide relative to first optics panel 24 to switch optics 16 between the opaque and transparent states. In another embodiment, first optics panel 24 may slide relative to second optics panel 26 to switch optics 16 between the opaque and transparent states. Reflective surface 14 may be included on one of first and second optics panels 24, 26.

First and second optics panels 24, 26 may include the same number of polarizer sections as indicated in FIGS. 4-9. However, in some embodiments, first and second optics panels 24, 26 may include different numbers of polarizer sections. In some embodiments, first and second optics panels 24, 26 may contain a plurality of polarizer sections such that the amount that first and second optics panels 24, 26 may slide relative to one another to switch between the opaque and transparent states may be reduced. For example, increasing the number of polarizer sections of first and second optics panels 24, 26 may reduce the distance first and second optics panels 24, 26 must slide relative to one another to switch between the opaque and transparent states.

Figure 10:
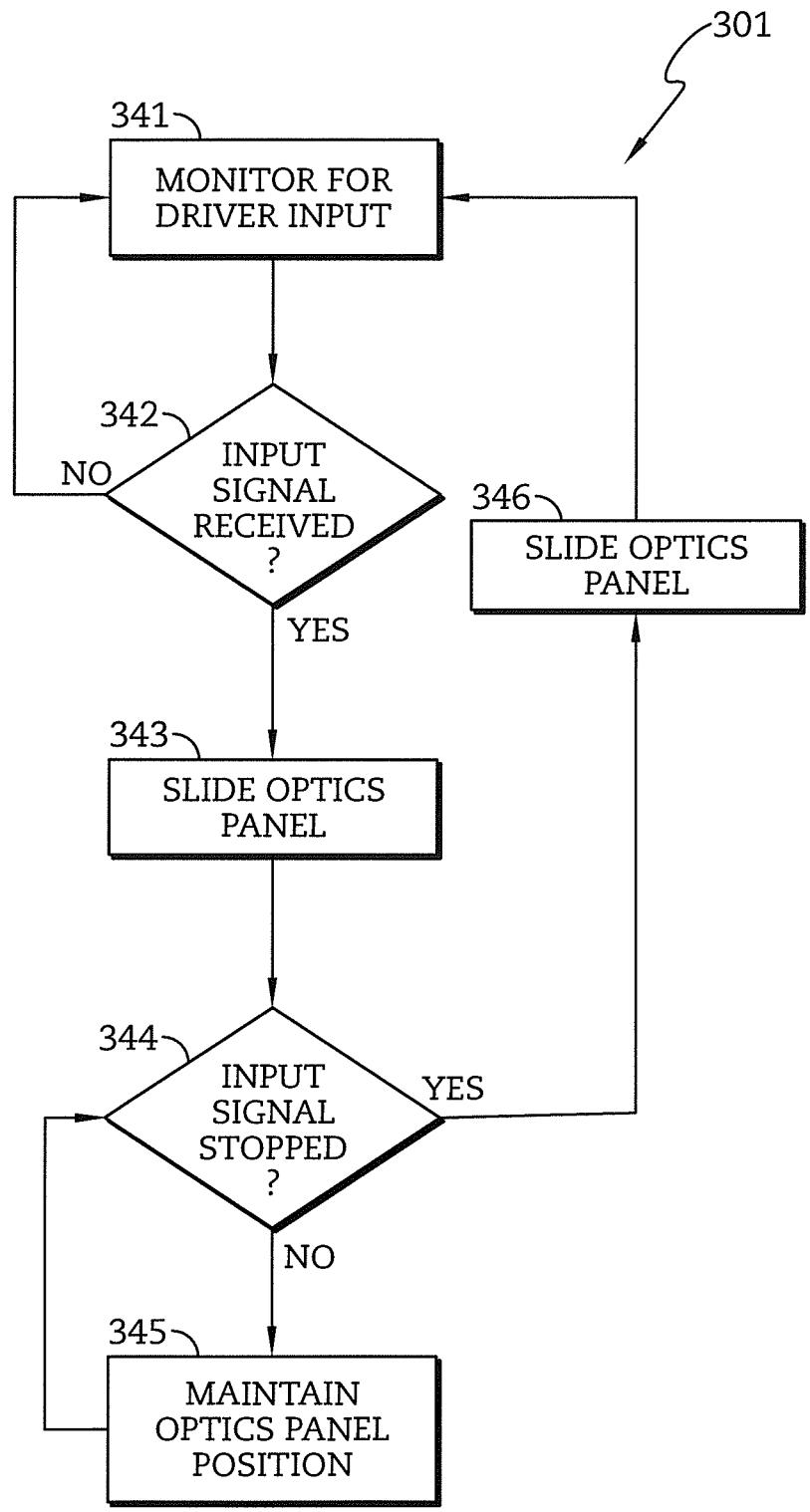
FIG. 10 is a diagrammatic view of an illustrative process for switching the opacity adjuster between the opaque state and transparent state.

In one illustrative embodiment, a process 301 may be used to determine when the first and second optics panels slide relative to one another as shown in FIG. 10. The process begins at 341, at which a signal from the user is monitored for to indicate when the opacity adjuster should engage to switch the optics between the opaque and transparent states. In some embodiments, a view angle of the user may be monitored and the input signal may be generated when the user's view angle is aligned with the switchable mirror. In other embodiments, a focal distance of the user's eyes may be monitored and the input signal may be generated when the focal distance is within a perimeter of the passenger vehicle. For example, the optics may be in the transparent state while the focal distance is towards a surrounding environment of the passenger vehicle and the optics may be in the opaque state while the focal distance is within an interior environment of the passenger vehicle, such as toward the switchable mirror. In yet other embodiments, the input signal may be generated when a switch or button is engaged by the user. Such a switch or button may be positioned, for example as illustrated in FIG. 1, on steering wheel 104, console 102, or drive shift mechanism 108, among other possible locations.

In yet other embodiments, the input signal may be generated when the user uses the drive shift mechanism to change between drive modes of the passenger vehicle.

Switchable mirror 10 may further include an object-of-interest indicator to signal the user that an object is blocked from view by switchable mirror 10 allowing the user to switch optics 16 to the transparent state to view the object. For example, when passenger vehicle 100 stops at an intersection, and another vehicle or pedestrian approaches the intersection, object-of-interest indicator signals to the user that an object is blocked from view by switchable mirror 10 to alert the user of the approaching vehicle or pedestrian. In another example, object-of-interest indicator may be programmed to recognize road signals, such as stop signs or stop lights, and signal to the user that an object is blocked from view by switchable mirror 10 to alert the user of the road sign. In yet another example, object-of-interest indicator may be programmed to recognize road conditions, such as intersections, blind turns, and slow traffic, and signal to the user that an object is blocked from view by switchable mirror 10 to alert the user of the road condition. The object-of-interest indicator may also automatically switch optics 16 to the transparent state to view the objects.

Returning to the process of FIG. 10, monitoring continues if no input signal is received as indicated at 342. Once the input signal is received, at 343, however, the first and second optics panels are controlled to slide relative to one another. Sliding the first and second optics panels relative to one another places the optics in one of the opaque and transparent states.

In some embodiments, the optics may be maintained in the transparent state until the input signal is received. For example, the optics may be in the transparent state until the user changes their view angle toward the switchable mirror. The optics may then switch to the opaque state after the view angle is placed on the switchable mirror for a prolonged period, such as about 1 second. In another example, the optics may remain in the transparent state while a focal distance of the user's eyes is toward a surrounding environment of the passenger vehicle and the optics may switch to the opaque state while the focal distance is within an interior environment of the passenger vehicle, such as toward the switchable mirror. In yet another example, the optics may remain in the transparent state while the passenger vehicle travels above a predetermined speed until the user provides an input signal to switch the optics to the opaque state. In yet another example, the optics may be in the transparent state until the drive shift mechanism engages a reverse drive mode of the passenger vehicle allowing the user to view objects behind the passenger vehicle off of the reflective surface of the switchable mirror. In yet another example, the optics may remain in the transparent state while a sensor senses movement of the passenger vehicle in a rearward direction, regardless of a position of the drive shift mechanism.

In other embodiments, the optics may be maintained in the opaque state until the input signal is received. For example, the optics may be in the opaque state until the user provides an input signal by engaging the button or switch. In another example, the optics may be in the opaque state until the passenger vehicle drops below a predetermined speed or comes to a stop to allow the user to view objects in front of the passenger vehicle that would otherwise be blocked by the switchable mirror. In yet another example, the optics may be in the opaque state until the user engages a turn indicator. It should be understood that these are non-limiting and non-exclusive examples of the various combinations of the state of the optics and input signal being received.

Positioning of the first and second optics panels may be maintained while the input signal is received as indicated at 345 in FIG. 10. The first and second optics panels may slide relative to one another when the input signal is stopped as indicated at 346. Monitoring for driver input then resumes. In some embodiments, monitoring for the input signal may be performed on a continuous basis to determine when the input signal has stopped. Monitoring may be conducted by the switchable mirror or the passenger vehicle, as two non-limiting examples. Monitoring may be conducted as part of subroutines for other processes.

Figure 11:
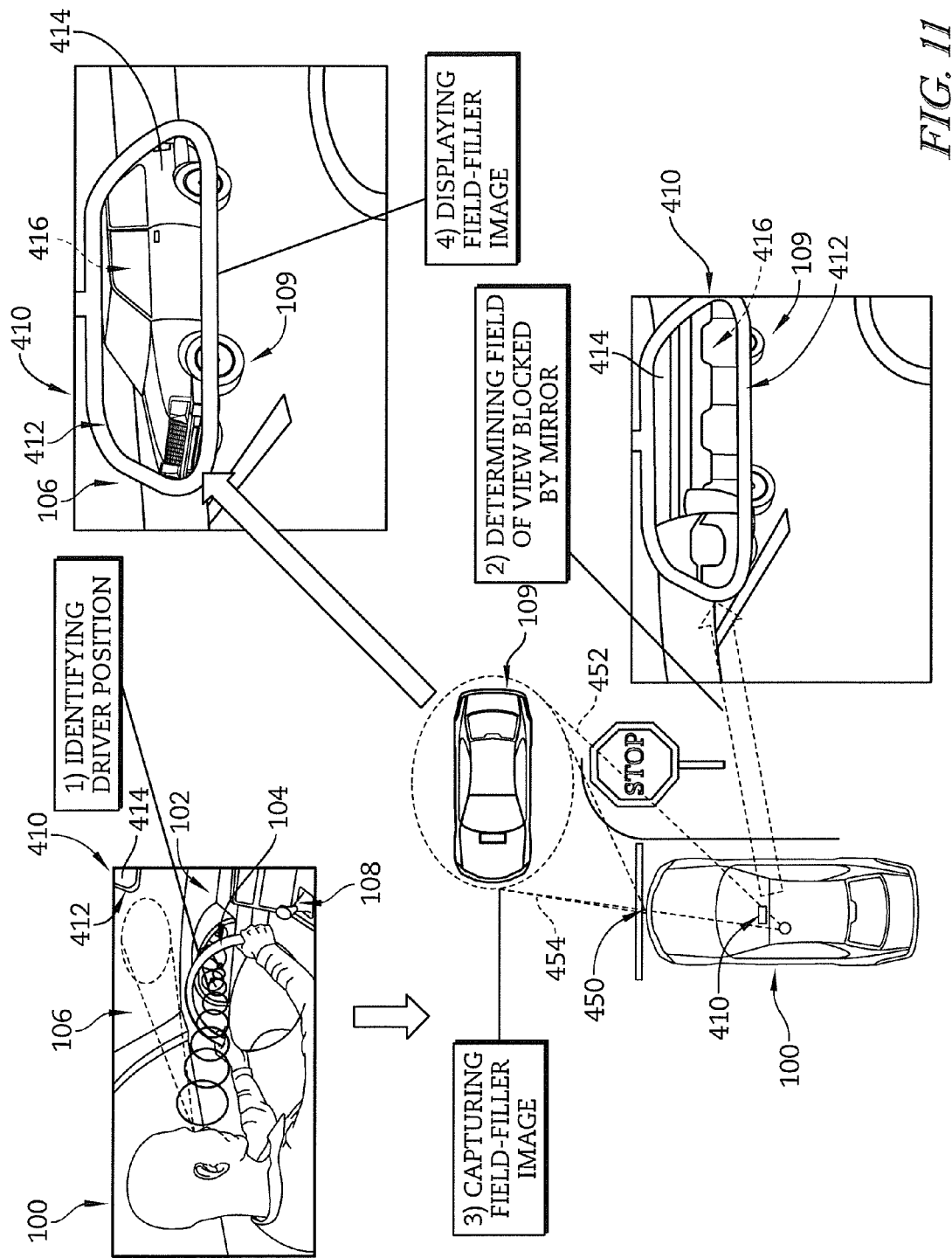
FIG. 11 is a diagrammatic view of a passenger vehicle incorporating one embodiment of a switchable mirror having a display positioned behind a reflective surface and suggesting that a field-filler image is displayed in the mirror to show a driver of the passenger vehicle objects positioned behind the switchable mirror that would otherwise be out of the driver's view.

Another embodiment of a switchable mirror 410 is shown in FIG. 11. In the illustrative embodiment, switchable mirror 410 includes a housing 412 coupled to windshield 106 of passenger vehicle 100 and a reflective surface 414 coupled to housing 412. Switchable mirror 410 also includes a display 416 coupled to housing 412 and positioned on an opposite side of reflective surface 414 from the user. A camera 450, or similar device for capturing images or video, is coupled to passenger vehicle 100 and positioned to capture images of objects in front of vehicle 100. For example, camera 450 may be coupled to the front grille of passenger vehicle 100. In one embodiment, camera 450 is coupled to housing 412 of switchable mirror 410. Other locations for camera 450 are possible, such as the headlights, "A"-pillar, or side-view mirrors of passenger vehicle 100, to name a few.

Camera 450 may be positioned to capture a field-filler image to fill in a field of view through windshield 106 that is blocked by switchable mirror 410 as indicated in FIG. 11. A position of the user may be identified and a field of view 452 that is blocked by switchable mirror 410 may be determined based on a relative position of the user and switchable mirror 410. Camera 450 may capture a field-filler image 454 of the field of view 452 blocked by switchable mirror 410 which may be sent to display 416.

Display 416 is switchable between an opaque state where a view of a rear of passenger vehicle 100 is reflected off of reflective surface 414 and a transparent state where display 416 is visible through reflective surface 414 as indicated in FIG. 11. For example, display 416 is disengaged while in the opaque state such that no image is being shown on display 416. Light produced by display 416 travels through reflective surface 414 while in the transparent state such that images shown on display 416 are visible to the user. In some embodiments, an additional camera, or similar device for capturing images or video, is placed facing a rear of passenger vehicle 100 which sends images to display 416 so that the user may view objects positioned behind passenger vehicle 100. In some embodiments, display 416 may be continuously engaged to show views of the front and rear of passenger vehicle 100 based on inputs from the user, and reflective surface 414 is coupled to housing 412 as a safety for if display 416 should malfunction.

Figure 12:
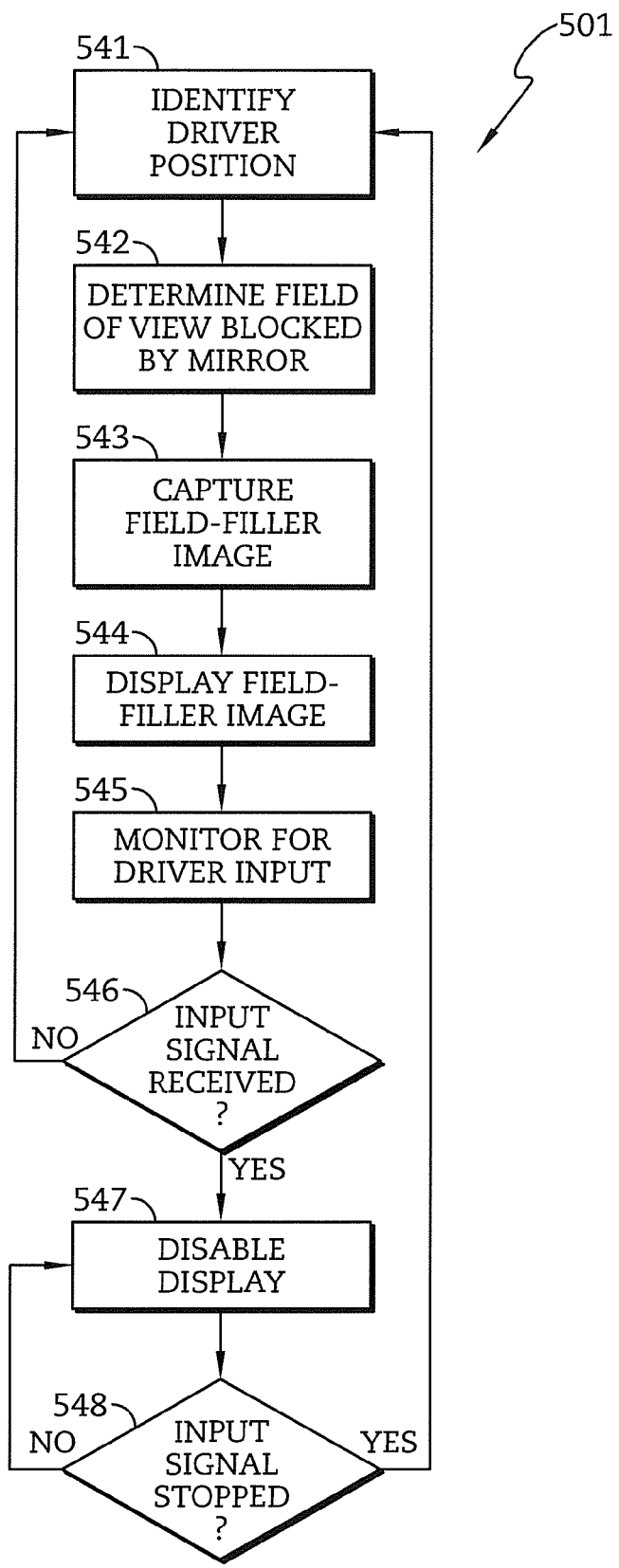
FIG. 12 is a diagrammatic view of an illustrative process for determining when to display the field-filler image.

In one illustrative embodiment, a process 501 may be used to determine when the display should be engaged or disengaged as shown in FIG. 12. The process begins at 541 where a position of the user is identified. For example, the switchable mirror or the passenger vehicle may include a distance measuring device to measure distances between the user and components of the switchable mirror or the passenger vehicle. In one embodiment, the switchable mirror may include a camera or laser based measurement device which measures the user's head position relative to a vertical height of switchable mirror, lateral position relative to a "B"-pillar of the passenger vehicle, and a front-to-back position relative to the switchable mirror. In other embodiments, measurement devices may be coupled to the console or the steering wheel of the passenger vehicle.

A field of view blocked by the switchable mirror may be determined based on the user's position as indicated at 542 of FIG. 12. For example, a vertical, lateral, and front-to-back position of the user and the switchable mirror may be used to determine a relative position between the switchable mirror and the user to then determine the field of view blocked by the switchable mirror. This is sometimes referred to as parallax positioning or movement. In some embodiments, process 501 may cease, and the display may remain disengaged, if it is determined that the switchable mirror does not block the user's view of a roadway that the passenger vehicle is travelling on. For example, the switchable mirror may not block the user's field of view if the user's head is positioned vertically below the switchable mirror.

A field-filler image may be captured by the camera based on the field of view blocked by the switchable mirror as indicated at 543 in FIG. 12. A direction in which the field-filler image is captured along will differ depending on the position of the camera relative to the switchable mirror. The field-filler image captured by the camera may be sent to the display which is engaged to show the user the objects positioned in the field of view blocked by the switchable mirror as indicated at 544. In some embodiments, the field-filler image may be shown on the display only after receiving input from the user. In other embodiments, a polarizer may be coupled to the housing of the switchable mirror to cover the display. The polarizer may reduce glare from environmental sources of light as one non-limiting example.

In the illustrative embodiment, a signal from the user is monitored for to indicate when the display should be disengaged to stop showing the field-filler image as indicated at 545 in FIG. 12. In some embodiments, a view angle of the user is monitored and the input signal may be generated when the user's view angle is aligned with the switchable mirror. In other embodiments, the input signal may be generated when a switch or button is engaged by the user. Such a switch or button may be positioned, for example as illustrated in FIG. 11, on steering wheel 104, console 102, or drive shift mechanism 108, among other possible locations. In yet other embodiments, the input signal may be generated when the user uses the drive shift mechanism to change between drive modes of the passenger vehicle. If no input signal is received, as indicated at 546, the process 501 may restart and a position of the user may be identified.

At 547 in FIG. 12, the display may be disabled when the input signal is received to allow the user to view objects at a rear of the vehicle reflected off of the reflective surface. For example, the display may be disengaged while a reverse drive mode of the passenger vehicle is engaged by the drive shift mechanism. It should be understood that this is a non-limiting and non-exclusive example. The process 501 may restart once the input signal is no longer generated as indicated at 548. In some embodiments, monitoring for the input signal may be performed on a continuous basis to determine when the input signal has stopped. Monitoring may be conducted by the switchable mirror or the passenger vehicle, as two non-limiting examples. Monitoring may be conducted as part of subroutines for other processes.

Disclosed embodiments provide a technical solution to the above-described technical problems of static vehicle monitoring structure within the cockpit of a vehicle. Disclosed embodiments provide the ability to dynamically alter the vehicle cockpit configuration by providing a mirror which allows a driver to view objects blocked from view by the mirror installed within the vehicle cockpit.

Although certain illustrative embodiments have been described in detail above, variations and modifications exist within the scope and spirit of this disclosure as described and as defined in the claims included in this application.

The invention claimed is:

1. An adjustable minor for use in a passenger vehicle, the adjustable mirror comprising:
    a housing adapted to be coupled to a vehicle windshield;
    a reflective surface in the housing to enable a user to view a rear view of the vehicle; and
    means for changing an opacity of the reflective surface between an opaque state wherein a user can view the rear view of the vehicle and a transparent state wherein the reflective surface becomes transparent such that the user can view objects positioned on an opposite side of the reflective surface from the user through the transparent reflective surface such that the user can view objects that would otherwise be blocked from view by the reflective surface while in the opaque state,
    wherein the means for changing opacity includes:
    an aperture formed through the housing and positioned to extend between a front side of the housing facing the user and a rear side of the housing facing the windshield; and
    an opacity adjuster coupled to the housing between the reflective surface and the vehicle windshield.

2. The adjustable mirror of claim 1, wherein the opacity adjuster includes a first optics panel coupled to the housing within the aperture and a second optics panel coupled to the housing within the aperture, the first optics panel positioned to lie between the second optics panel and the windshield of the vehicle such that the first and second optics panels cooperate to block or allow the passage of light through the opacity adjuster.

3. The adjustable mirror of claim 2, wherein the first optics panel includes a first polarizer section having a first polarization angle and a second polarizer section coupled to the first polarizer section and having a second polarization angle; and
    wherein the second optics panel has a third polarizer section having the second polarization angle and a fourth polarizer section coupled to the third polarizer section and having the first polarization angle.

4. The adjustable mirror of claim 3, wherein the first polarization angle is ninety degrees offset relative to the second polarization angle such that, when the first polarizer section is aligned with the third polarizer section and the second polarizer section is aligned with the fourth polarizer section, light is blocked from passing through the opacity adjuster.

5. The adjustable mirror of claim 4, wherein the first and second optics panels are movable relative to one another.

6. The adjustable mirror of claim 2, wherein the reflective surface is attached to one of the first and second optics panels.

7. The adjustable mirror of claim 1, wherein the opacity adjuster is electrochromic, polymer dispersed liquid crystal, or nanocrystal switchable glass.

8. The adjustable mirror of claim 1, wherein the opacity adjuster includes a display positioned on an opposite side of the reflective surface from the user and a camera positioned to provide visual data to the display.

9. A method of adjusting an adjustable mirror for use in a passenger vehicle, the method comprising:
receiving an input signal from a user; and
engaging means for changing an opacity of a reflective surface between an opaque state wherein a user can view a rear view of the vehicle and a transparent state wherein the reflective surface becomes transparent such that the user can view objects positioned on an opposite side of the reflective surface from the user through the transparent reflective surface such that the user can view objects that would otherwise be blocked from view by the reflective surface while in the opaque state in response to the input signal;
wherein a housing of the adjustable minor is adapted to be coupled to a vehicle windshield and the reflective surface is in the housing.

10. The method of claim 9, further comprising identifying a position of the user; and
determining a field of view blocked by the reflective surface based on the position of the user.

11. The method of claim 10, wherein engaging the means for changing opacity includes capturing at least one field-filler image based on the field of view blocked by the reflective surface and displaying the at least one field-filler image on a display positioned on an opposite side of the reflective surface from the user.

12. The method of claim 9, wherein the means for changing opacity includes an aperture formed through the housing and positioned to extend between a front side of the housing facing the user and a rear side of the housing facing the vehicle windshield and an opacity adjuster coupled to the housing between the reflective surface and the windshield of the vehicle, the opacity adjuster including a first optics panel coupled to the housing within the aperture and a second optics panel coupled to the housing within the aperture, the first optics panel positioned to lie between the second optics panel and the windshield of the vehicle such that the first and second optics panels cooperate to block or allow the passage of light through the opacity adjuster.

13. The method of claim 12, wherein the first optics panel includes a first polarizer section having a first polarization angle and a second polarizer section coupled to the first polarizer section and having a second polarization angle;
wherein the second optics panel has a third polarizer section having the second polarization angle and a fourth polarizer section coupled to the third polarizer section and having the first polarization angle;
wherein the first polarization angle is ninety degrees offset relative to the second polarization angle such that, when the first polarizer section is aligned with the third polarizer section and the second polarizer section is aligned with the fourth polarizer section, light is blocked from passing through the opacity adjuster; and
wherein the first and second optics panels are movable relative to one another.

14. The method of claim 13, wherein engaging the means for changing opacity includes moving the first and second optics panels relative to one another to align the first polarizer section with the third polarizer section and the second polarizer section with the fourth polarizer section to place the reflective surface in the opaque state or to misalign the first polarizer section with the third polarizer section and the second polarizer section with the fourth polarizer section to place the reflective surface in the transparent state.

15. The method of claim 12, wherein the opacity adjuster is electrochromic, polymer dispersed liquid crystal, or nanocrystal switchable glass and engaging the view-block remover includes energizing or de-energizing the switchable glass to transition the reflective surface between the opaque and transparent states.

16. The method of claim 9, wherein the input signal is transmitted in response to the user engaging a switch.

17. The method of claim 16, wherein the switch is placed on one of a steering wheel, shifter, or dashboard of a vehicle.

18. The method of claim 9, further comprising monitoring a view angle of the user and transmitting the input signal to the means for changing opacity in response to the view angle of the user being placed on the reflective surface to place the reflective surface in the opaque state.

19. An adjustable minor for use in a passenger vehicle, the adjustable mirror comprising:
a housing adapted to be coupled to a vehicle windshield;
a reflective surface in the housing to enable a user to view a rear view of the vehicle, and
optics including an aperture formed through the housing and positioned to extend between a front side of the housing facing the user and a rear side of the housing facing the windshield and an opacity adjuster coupled to the housing between the reflective surface and the vehicle windshield, the opacity adjuster having a first optics panel coupled to the housing within the aperture and a second optics panel coupled to the housing within the aperture, the first optics panel positioned to lie between the second optics panel and the windshield of the vehicle;
wherein the first optics panel includes a first polarizer section having a first polarization angle and a second polarizer section coupled to the first polarizer section and having a second polarization angle, the second optics panel has a third polarizer section having the second polarization angle and a fourth polarizer section coupled to the third polarizer section and having the first polarization angle, and the first polarization angle is ninety degrees offset relative to the second polarization angle such that, when the first polarizer section is aligned with the third polarizer section and the second polarizer section is aligned with the fourth polarizer section, light is blocked from passing through the opacity adjuster.

* * * * *

UNITED STATES PATENT AND TRADEMARK OFFICE
CERTIFICATE OF CORRECTION

PATENT NO. : 9,493,121 B2  
APPLICATION NO. : 14/603725  
DATED : November 15, 2016  
INVENTOR(S) : Jacob Hercules Page 1 of 1

It is certified that error appears in the above-identified patent and that said Letters Patent is hereby corrected as shown below:

In the Specification

Column 1, Line 12 - replace "minor" with "mirror"

In the Claims

Column 8, Line 15 (Claim 1) - replace "minor" with "mirror"

Column 9, Line 1 (Claim 8) - replace "minor" with "mirror"

Column 9, Line 18 (Claim 9) - replace "minor" with "mirror"

Column 10, Line 27 (Claim 19) - replace "minor" with "mirror"

Signed and Sealed this  
Thirty-first Day of January, 2017

Michelle K. Lee  
*Director of the United States Patent and Trademark Office*